(12) United States Patent
Fang et al.

(10) Patent No.: US 6,539,518 B1
(45) Date of Patent: Mar. 25, 2003

(54) AUTODISK CONTROLLER

(75) Inventors: Cheng-Chi Fang, Union City, CA (US); Chao-I Chang, San Jose, CA (US)

(73) Assignee: Integrated Memory Logic, Inc., Santa Clara, CA (US)

( * ) Notice: Subject to any disclaimer, the term of this patent is extended or adjusted under 35 U.S.C. 154(b) by 0 days.

(21) Appl. No.: 09/393,785

(22) Filed: Sep. 10, 1999

(51) Int. Cl.[7] .............................................. G11B 27/36
(52) U.S. Cl. ............................ 714/805; 369/54; 369/56
(58) Field of Search ................................. 714/755, 756, 714/769, 805; 369/54, 56

(56) References Cited

U.S. PATENT DOCUMENTS

| | | | | | |
|---|---|---|---|---|---|
| 4,199,820 A | * | 4/1980 | Ohtake et al. | ............... | 365/234 |
| 5,109,500 A | * | 4/1992 | Iseki et al. | ................. | 710/74 |
| 5,617,382 A | * | 4/1997 | Kobunaya et al. | ........ | 369/30.13 |
| 5,818,801 A | * | 10/1998 | Watanabe et al. | ........ | 369/30.23 |
| 5,878,005 A | * | 3/1999 | Tonegawa et al. | ....... | 369/44.27 |
| 5,878,024 A | * | 3/1999 | Kobayashi et al. | ...... | 369/275.3 |
| 5,878,184 A | * | 3/1999 | Tajiri | ........................... | 360/32 |
| 5,943,307 A | * | 8/1999 | Takagi et al. | ............. | 369/47.33 |
| 5,995,462 A | * | 11/1999 | Harold-Barry | ........... | 369/53.18 |
| 6,005,839 A | * | 12/1999 | Sako et al. | ............... | 369/275.3 |
| 6,018,506 A | * | 1/2000 | Okabe et al. | ............ | 369/30.23 |
| 6,105,107 A | * | 8/2000 | Ho et al. | ..................... | 709/217 |
| 6,112,324 A | * | 8/2000 | Howe et al. | ................. | 707/205 |
| 6,192,013 B1 | * | 2/2001 | Kimura et al. | ........... | 369/47.31 |
| 6,198,705 B1 | * | 3/2001 | Tran et al. | ................ | 369/30.03 |
| 6,272,086 B1 | * | 8/2001 | Jaquette et al. | .......... | 369/13.02 |

* cited by examiner

Primary Examiner—Stephen M. Baker
(74) Attorney, Agent, or Firm—Skjerven Morrill LLP

(57) ABSTRACT

A device controller having an autodisk controller is presented. The autodisk controller in monitor mode is capable of monitoring the address of incoming data blocks and, when a target address is reached, triggers a switch of the device controller to buffer mode. In buffer mode, the autodisk controller is capable of monitoring parameters regarding incoming data blocks and reporting status or errors to a microprocessor. The autodisk controller can, for example, check for Id errors, EDC errors, copyright errors, addressing errors, or data area errors. The autodisk controller can also monitor the memory buffer and determine when it is full. The autodisk controller, therefore, relieves the microprocessor of the duties of monitoring incoming data blocks and error checking those data blocks.

19 Claims, 14 Drawing Sheets

400

| Byte | DVD Read | CD-ROM Read |
|---|---|---|
| 0 | A8 | 28 |
| 1 | Reserved | Reserved |
| 2 | (MSB) LBA | Reserved |
| 3 | LBA | (MSB) LBA |
| 4 | LBA | LBA |
| 5 | (LSB) LBA | (LSB) LBA |
| 6 | (MSB) Transfer Length | Reserved |
| 7 | Transfer Length | Reserved |
| 8 | Transfer Length | (MSB) Transfer Length |
| 9 | (LSB) Transfer Length | (LSB) Transfer Length |
| 10 | Reserved | Reserved |
| 11 | Reserved | Reserved |

FIG. 4

```
//******************************************************************
//    CodeName  : autodvd.v                                        *
//    Block     : Auto Disk dvd-rom Control                        *
//    Date      : 4/2/97                                           *
//    Author    : David Chang                                     *
//    Functions : define dvd-decoder control signals              *
//    History   : rev. 0 . 0 : 4/2/97                             *
//******************************************************************
`timescale 1 ns / 10 ps module autodvd ( crst, psclk, autodisk, areachk, seqchk, cprchk,
            tarsrh, tgah, tgam, tgal, clbah, clbam, clbal, atype, cpm, cpsec,
            opmode, dvdinc_done, buff_full, vinvalid, voverr, viederr, vcid,
            vnosync, villsync, dvdmon_buf, dvdbuf_stp, autodvd_intr, tarrch_set,
            tarrch_clr, oshterr_set, oshterr_clr, diskerr_set, diskerr_clr,
oprerr_set,
            cprerr_clr, areaerr_set, areaerr_clr, seqerr_set, seqerr_clr,
            bufffull_set, bufffull_clr, autodvd_inc  , idchk_go, seqerr,
areaerr,
            cprerr, vedcerr, lnum, lerr_set, lerr_clr, lerr, lchk, autoerr,
lnum_val;
            locken, dpause, dvdbuf_pause, dvdbuf_resme, dvdbufmd, lock_lba,
reqhold,
            lockdvd, tarrch, oshchkd, adsie
                );

parameter   disauto  =   8'b00000000;
parameter   newstatu =   8'b00000001;
parameter   storelba =   8'b00000010;
parameter   dvdinc   =   8'b00000100;
parameter   lockdet  =   8'b00000101;
parameter   autoinc  =   8'b00001000;
parameter   wrfullst =   8'b00010000;
parameter   wdvdintr =   8'b00100000;
parameter   waitinc  =   8'b01000000;
parameter   newlba   =   8'b10000000;

input              psclk;
input              crst;
input              autodisk;
input              areachk;
input              seqchk;
input              cprchk;
input              tarsrh;
input     [7:0]    tgah;
input     [7:0]    tgam;
input     [7:0]    tgal;
input     [7:0]    clbah;
input     [7:0]    clbam;
input     [7:0]    clbal;
input     [1:0]    atype;
input              opm;
input              opsec;
input     [1:0]    opmode;
input              idchk_go;
```

FIG. 7A

| | | |
|---|---|---|
| input | dvdinc_done; | |
| input | buff_full; | |
| input | vinvalid; | |
| input | voverr; | |
| input | vedcerr; | |
| input | viederr; | |
| input | vcid; | |
| input | vnosync; | |
| input | villsync; | |
| input | seqerr; | |
| input | areaerr; | |
| input | cprerr; | |
| input | lnum; | |
| input | lnum_val; | |
| input | lerr; | |
| input | lchk; | |
| input | autoerr; | |
| input | locken; | |
| input | dpause; | |
| input | tarrch; | |
| input | oshchkd; | |
| input | adsie; | |
| output | dvdmon_buf; | |
| output | dvdbuf_stp; | |
| output | autodvd_intr; | |
| output | tarrch_set; | |
| output | tarrch_clr; | |
| output | oshterr_set; | |
| output | oshterr_clr; | |
| output | diskerr_set; | |
| output | diskerr_clr; | |
| output | cprerr_set; | |
| output | cprerr_clr; | |
| output | areaerr_set; | |
| output | areaerr_clr; | |
| output | seqerr_set; | |
| output | seqerr_clr; | |
| output | lerr_set; | |
| output | lerr_clr; | |
| output | bufffull_set; | |
| output | bufffull_clr; | |
| output | autodvd_inc; | |
| output | dvdbuf_pause; | |
| output | dvdbuf_resme; | |
| output | dvdbufmd; | |
| output | [23:0] | lock_lba; |
| output | reqhold; | |
| output | lockdvd; | |
| wire | srch_en; | |
| wire | [24:0] | ovsh_val; |
| wire | [23:0] | target_lba; |
| wire | tagrch_chk; | |
| wire | diskerr_stu; | |
| wire | diskerr_set; | |
| wire | oshterr_set; | |

FIG. 7B

```
wire         oshterr_clr;
wire         tarrch_set;
wire         tarrch_clr;
wire         cprerr_set;
wire         cprerr_clr;
wire         areaerr_set;
wire         areaerr_clr;
wire         seqerr_set;
wire         seqerr_clr;
wire         lerr_set;
wire         lerr_clr;
wire         bufffull_set;
wire         bufffull_clr;
wire         autodvd_intr;
wire         dvdinc_stu;
wire         cprerr_stu;
wire         seqchk_stu;
wire         autodvd_inc;
wire         dvdbufmd;
wire         lockdvd_inc;
wire         unlock_trig;
wire         reqhold;
wire         lockdvd;
wire  [23:0] mvalue;
wire         psmnton;

reg   [23:0] pre_lba;
reg   [23:0] lock_lba;
reg   [7:0]  autodvd_stv;
reg          dvdmon_buf;
reg          dvdbuf_stp;
reg          dvdbuf_pause;
reg          dvdbuf_resme;
reg          locken_dly;
reg          unlock_flg;
reg   [2:0]  lock_cnt;
reg          unlock_inc;
reg          autodisk_dly;
reg          seqchken;

// Target Auto Search in DVD Pseudo Monitor Mode
assign srch_en = tarsrh & ~tarrch & (opmode [0] == 1);
assign psmnton = ( opmode == 2'bll );
assign mvalue  = psmnton ? 0: 24'hl;
assign target_lba = {tgah, tgam, tgal} - mvalue;
assign ovsh_val = {1'bl, target_lba} - {1'b0, clbah, clbam, clbal};

assign tagrch_chk = (ovsh_val == 25'h1000000);
assign tarrch_set = tagrch_chk & srch_en & idchk_go;
assign tarrch_clr = (~srch_en | ~tagrch_chk) & idchk_go;

assign oshterr_set = ~ovsh_val [24] & srch_en & idchk_go;
assign oshterr_clr = (~srch_en | ovsh_val [24 ]) & idchk_go | oshchkd;

// swith to buffer mode when autodisk mode is on
always @ (posedge psclk)
  dvdmon_buf <= autodvd_stv[5] & tarrch & (opmode[0] == 1) & ~lerr;
```

FIG. 7C

```
assign diskerr_set = autodisk_dly & idchk_go & diskerr_stu;
assign diskerr_clr = (~autodisk_dly | ~diskerr_stu) & idchk_go;

assign diskerr_stu = voverr | vedcerr | viederr | vcid | vnosync | villsync;
assign cprerr_set = autodisk_dly & cprchk & idchk_go & atype == 2'b00 & (opmode
== 2'b10) &
            (cpm | cpsec);
assign cprerr_clr = (~autodisk_dly | ~cprchk | ~(cpm | cpsec) | atype[1] |
atype[0] |
            ~(opmode == 2'b10) | & idchk_go;
assign areaerr_set = autodisk_dly & areachk&idchk_go & (atype[1] | atype[0]) &
(opmode == 2'b10) ;
assign areaerr_clr = (~autodisk_ dly | ~areachk | atype == 2'b00 | ~(opmode ==
2'b10)) & idchk)go;
assign seqerr_set  autodisk_dly & seqchk seqchken & idchk_go & (opmode ==
2'b10) & ~seqchk_stu;
assign seqerr_clr = (~autodisk _dly | ~(seqchk & seqchken) | ~(opmode == 2'b10) |
seqchk_stu) & idchk_go;
assign seqchk_stu = ((pre_lba + 1) == {clbah, clbam,clbal}) ;
assign lerr_set = autodisk_dly & lchk & ~(lnum == lnum_val) & idchk_go;
assign lerr_clr = (~autodisk_dly | ~lchk | lnum == lnum_val) & idchk_go;
assign lockdvd = autodvd_stv[7] & ~locken;
// store previous LBA at same time with valid cache count update
always @ (posedge psclk)
    if (autodvd_stv[7])
      pre_lba <= {clbah,clbam,clbal};
always @ (posedge psclk or posedge crst)
    begin
      if (crst)
        seqchken <= 1'b0;
      else if (~(opmode == 2'b10))
        seqchken <= 1'b0;
      else if (idchk_go & (opmode == 2'b10))
        seqchken <= 1'b1;
    end
always @ (posedge psclk)
    if (lockdvd)
      lock_lba <={clbah,clbam,clbal};
always @ (posedge psclk)
    autodisk_dly <= autodisk;
// Sequence Control State Machine
always @ (posedge psclk or posedge crst)
    begin
      if (crst)
        autodvd_stv <= disauto;
      else
        case (autodvd_stv)
          disauto : if (idchk_go & autodisk_dly & ~(opmode == 2'b00)) // Non Stop
Mode
                      autodvd_stv <= newstatu;

newstatu : autodvd_stv <= storelba;// Update Status storelba : autodvd_stv <= dvdinc; // Store New LBA dvdinc : begin
```

FIG. 7D

```
                    if ((dvdinc_stu & ~(opmode == 2'b00)) | (opmode[0] == 1) |
villsync)
                        autodvd_stv <= wrfullst;// Not Inc Valid Cache Count
                    else if (~dvdinc_stu & (opmode == 2'b10) & autodisk_dly)
                        autodvd_stv <= lockdet; // Inc Valid Cache Count
                    else if (opmode == 2'b00)
                        autodvd_stv <= disauto;
                    end
        lockdet :
                if (~unlock_flg)
                    autodvd_stv <= autoinc;
        autoinc : if (locken)
                    autodvd_stv <= newlba;
                else
                        autodvd_stv <= waitinc;
        waitinc :
                if (dvdinc_done & (opmode == 2'b10))
                    autodvd_stv <= wrfullst;
        wrfullst :
                        autodvd_stv <= wdvdintr;
        wdvdintr :
                    autodvd_stv <= newlba;
        newlba :
                    autodvd_stv <= disauto;
        endcase
    end // after unlock state try to update valid cache count
always @ (posedge psclk)
        unlock_inc <= (unlock_trig & autodisk_dly & ~(lock_cnt == 3'b000)) |
(dvdinc_done & unlock_flg & ~(lock_cnt == 3'b001) & ~autodvd_stv[6]);

// update valid cache count check
assign dvdinc_stu = voverr | vedcerr | viederr | villsync | seqerr | cprerr |
areaerr | lerr;
assign autodvd_inc = (autodvd_stv[3] & ~locken) | unlock_inc;
assign lockdvd_inc = autodvd_stv[3] & locken;
// Detect after unLock
always @ (posedge psclk)
    locken_dly <= locken;
assign unlock_trig = ~locken & locken_dly;
always @ (posedge psclk or posedge crst)
    begin
    if (crst)
        unlock_flg <= 1'b0;
    else if (unlock_trig & autodisk_dly & ~(lock_cnt == 3'b000))
        unlock_flg <= 1'b1;
    else if (dvdinc_done & unlock_flg & (lock_cnt == 3'b001) & ~autodvd_stv[6])
        unlock_flg <= 1'b0;
    end // lock period new block count
always @ (posedge psclk or posedge crst)
    if (crst)
        lock_cnt <= 3'b000;
    else if (lockdvd_inc)
        lock_cnt <= lock_cnt + 1;
```

FIG. 7E

```
      else if (dvdinc_done & unlock_flg & ~(lock_cnt == 3'b000) & ~autodvd_stv[6])
          lock_cnt <= lock_cnt - 1;

// Interrupt Generate
assign autodvd_intr = autodvd_stv[5] & (autoerr | adsie & (opmode == 2'b10));
assign bufffull_set = autodvd_stv[4] & buff_full;
assign bufffull_clr = autodvd_stv[4] & ~buff_full;
// buffer full back to STOP mode if serial bus been selected
always @ (posedge psclk)
    dvdbuf_stp <= autodvd_stv[5] & dvdinc_stu & (opmode == 2'b10);
// pause flag for parrallel bus
always @ (posedge psclk)
    dvdbuf_pause <= bufffull_set & (opmode == 2'b10);
// resume flag
always @ (posedge psclk)
    dvdbuf_resme <= autodisk_dly & dpause & (opmode == 2'b10) & ~buff_full;

assign dvdbufmd = opmode == 2'b10;
assign reqhold = dpause;
endmodule
```

FIG. 7F

AUTODISK CONTROLLER

BACKGROUND

1. Fielf of the Invention

This invention relates generally to disk controllers and in particular to a disk controller for DVD-ROM/RAM/R and CD-ROM drives.

2. Related Art

Advances in semiconductor manufacturing and microprocessor design have combined to create microprocessors with enormous processing power running at very high frequencies. However, the benefits of fast microprocessors are lost in a computer system that is also unable to retrieve data at a very high rate. Many techniques to improve the rate of data transfer between the microprocessor and main memory have been developed. However, the data transfer rate from storage devices—such as CD-ROM drives, DVD ROM/RAM/R, hard drives, and tape drives—to main memory or directly to the microprocessor still presents a bottleneck to the overall performance of the computer system.

Many computer applications process large quantities of data. For example, a multimedia application may process both video and audio data. High resolution graphics and high quality sound require a vast amount of audio and video data that must be transferred between the physical storage device and the multimedia system. CD-ROM disks are inexpensive to manufacture and hold a large quantity of data and therefore are the preferred medium for storing data. Another popular medium for multimedia data storage is digital video disk (DVD). However, other storage devices such as magnetic fixed disks and magneto-optical disks are also used. The data transfer rate between the storage device and the processor may dictate the speed of the entire computer system because data must be retrieved from the storage device for the application program. An increase in the data transfer rate between the storage device and the host system, therefore, increase the speed of the entire computer system.

FIG. 1 shows a block diagram of a typical storage device 100 coupled to a host computer system 190 through a peripheral bus 160. A storage media 110, for example a CD-ROM, a DVD, a magnetic disk, or a magnetic tape, is driven by a motor 114 under the control of a motor/servo controller 118. Data on storage media 110 are stored in storage media data blocks. The specific format of a storage media data block is standardized but is different for each medium. FIG. 3(b) illustrates a storage media block of a CD-ROM disk and FIGS. 3(c) and 3(d) illustrate a storage media block for a DVD after the data is retrieved and processed by a typical CD-ROM/DVD controller. A signal detector/writer 122 (see FIG. 1), i.e., an optical head or a magnetic head, reads and writes data into storage media 110. Signal detector/writer 122 may read or generate feedback signals that are sent to motor/servo controller 118 for synchronization and tracking purposes.

On read transfers, the signal read by signal detector/writer 122 is amplified by an amplifier 126. In storage devices, synchronization data are also amplified before being sent to motor/servo controller 118. The amplified data signal is then sent to a digital signal processor (DSP) 130, which may also provide control signals to motor/servo controller 118, after converting the analog data signal to a digital signal in analog to digital converter 135. DSP 130 processes the digitized data in preparation for use by host computer system 190.

For example, a CD-ROM drive typically provides audio data recorded in digital form to an external amplifier in analog form. The processed digital data is sent to a device controller 140. In some storage devices, a secondary data channel may also be stored on storage media 110. For example, a CD-ROM disk contains a secondary data channel called the subcode data channel. On write transfers, DSP 130 generates a data signal for signal detector/writer 122 in response to data received from host computer system 190.

Device controller 140 typically uses a memory buffer 150 as a cache or buffer memory for the processed data from storage media 110 or the incoming data from host computer system 190. Device controller 140 also provides an interface between storage device 100 and peripheral bus 160.

Peripheral bus 160 could be, for example, an IDE bus using ATAPI protocols, a SCSI bus or an IEEE 1394-1995 bus. Because peripheral bus 160 communicates with many different types of storage devices, transfers on peripheral bus 160 are typically based on the number of data words to transfer rather than the number of storage media blocks. Peripheral bus 160 couples storage device 100 to host computer system 190.

Storage device 100 also contains a microcontroller 170, which could be a microprocessor, to control the components of storage device 100. Microcontroller 170 may use a portion of memory buffer 150 for system information. Microcontroller 170 executes firmware instructions, i.e. computer code stored in microcontroller 170, a ROM (not shown) or a flash memory device (not shown), to interface with host computer system 190 in conjunction with device controller 140 through peripheral bus 160. To reduce the cost of storage device 100, microcontroller 170 is typically a less powerful device than the microprocessor of host computer system 190. Therefore, microcontroller 170 executes instructions at a slower rate than the microprocessor of host computer system 190, further decreasing the data transfer rate between storage device 100 and host computer system 190.

In a typical read transaction, host computer system 190 sends a request for data through peripheral bus 160 to microcontroller 170 and device controller 140. Microcontroller 170, along with device controller 140, interprets the request and retrieves the requested data from storage media 110 into memory buffer 150. When memory buffer 150 contains a sufficient amount of data, device controller 140 and microcontroller 170 sends the stored data from memory buffer 150 to host computer system 190 through peripheral bus 160. The specific amount of data stored in memory buffer 150 before transfer to host computer system 190 depends on the specific request made by host computer system 190.

In a typical write transaction, host computer system 190 sends a write request to peripheral bus 160. Microcontroller 170 along with device controller 140 interprets the request and receives the incoming data from host computer system 190 into memory buffer 150. When memory buffer 150 contains a sufficient amount of data, device controller 140 and microcontroller 170 send the stored data from memory buffer 150 to storage media 110.

Interfacing with peripheral bus 160 and with storage media 110 is typically very complex. Therefore, the tasks of interfacing is divided between microcontroller 170 and device controller 140. In conventional storage devices, microcontroller 170 handles the bulk of the control portion of the interfaces and device controller 140 primarily handles the data transfer. However, since microcontroller 170 is a slow device, substantial delays are introduced by over-reliance on microcontroller 170. Therefore, there is a need for a method or apparatus to interface efficiently with peripheral bus 160 and with storage media 110 without the need for excessive assistance from microcontroller 170.

SUMMARY

According to the present invention, a device controller (which may also be referred to as a disk controller) having an autodisk controller is presented. The autodisk controller intercepts the interrupt from a storage device interface to a microcontroller when new blocks of data are read from the storage device. In most embodiments, the autodisk controller is capable of operating in a monitor mode or in a buffer mode. In monitoring mode, the autodisk controller is capable of monitoring the block header for the incoming address and, if the block address indicates that a target address has been overshot or another error has been detected, notices the microcontroller. Additionally, if a target address has been achieved the autodisk controller can trigger a switch of the device controller to buffer mode.

In buffer mode, incoming blocks of data can be monitored and the microcontroller is noticed if there is an error. Incoming data blocks can be monitored for any errors, including correct addresses, data errors, copyright protection, and invalid or unallowed reads. Additionally, the autodisk controller can monitor a memory buffer and alert the microcontroller when the memory buffer is full.

The autodisk controller also interfaces with data and information registers for communicating status and operating parameters. These registers can include address registers, sector information registers, copyright information registers, status registers, configuration registers and control registers. The autodisk controller operates in accordance with the values set in these registers and communicates with the microprocessor and other portions of the device controller through these registers. A device controller according to the present invention includes a storage device interface for interfacing with a storage device, a memory interface for interfacing with a memory buffer and a microprocessor interface for interfacing with a microprocessor, and as autodisk controller coupled to the storage device interface and the microprocessor interface.

In a monitor mode, the autodisk controller is capable of receiving device addresses of an incoming data block and comparing it with a stored target address. The autodisk controller can then alert the microprocessor when the target address is reached or if the target address is overshot. Once the target address is reached, the device controller can switch to buffer mode.

In buffer mode, the autodisk controller can monitor incoming data blocks for error. For example, sector ID errors, data EDC errors, copyright protection errors, sequential addressing errors, and data area errors can be monitored by the autodisk controller. Furthermore, the memory buffer can be monitored so that the autodisk controller generates a buffer full error when the buffer is full. Additionally, the autodisk controller can automatically update a valid cache block counter, indicating the number of blocks of data stored in the memory buffer, as blocks of data are buffered. The autodisk controller, therefore, relieves the microprocessors of monitoring and error checking activities during storage device read and write operation.

Embodiments of the invention are further explained in the following discussion with reference to the following figures.

DESCRIPTION OF THE FIGURES

FIG. 4 shows a 12 byte command packet compatible with the ATA/ATAPI protocol.

FIG. 7 (collectively FIGS. 7A through 7F) shows Verilog code for an implementation of an autodisk controller according to the present invention.

DETAILED DESCRIPTION

Figure 1:
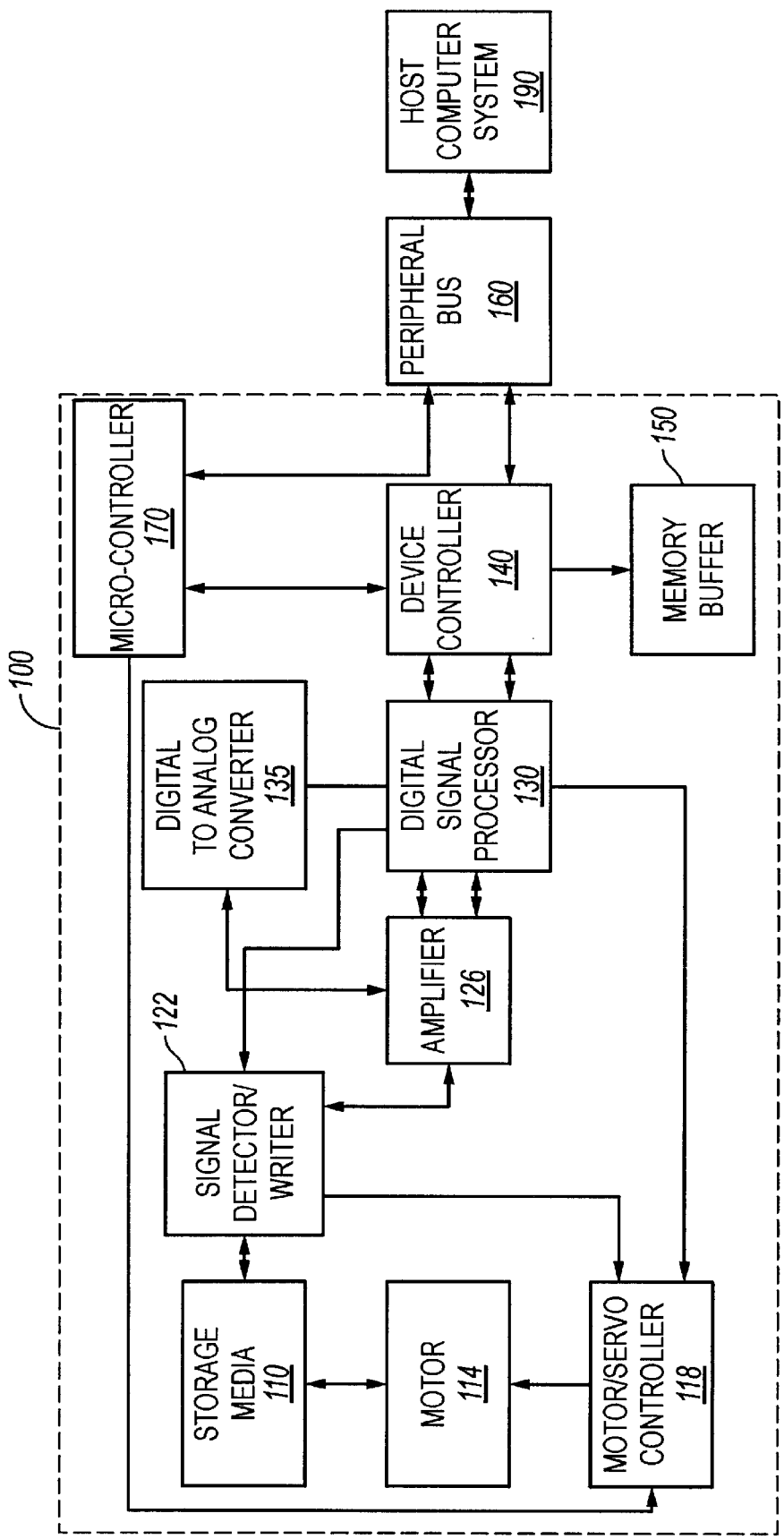
FIG. 1 shows a block diagram of a typical physical storage device.
Figure 2:
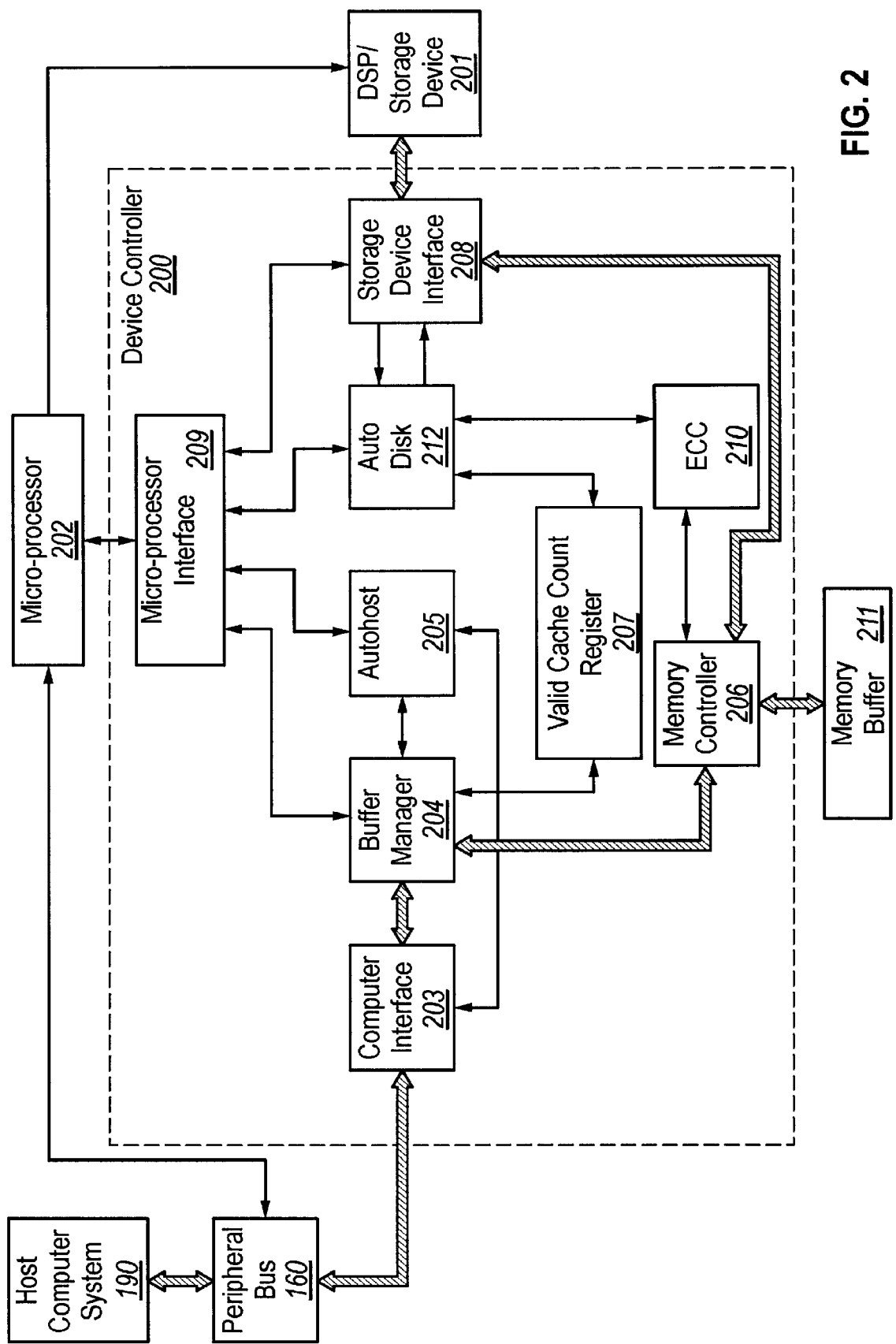
FIG. 2 shows a block diagram of a physical storage device controller according to an embodiment of the present invention.

FIG. 2 shows a functional block diagram of a device controller 200 according to the present invention. Host computer system 190 communicates with a device controller 200 through peripheral bus 160 as in FIG. 1. Information passing between the host computer 190 and device controller 200 are received into and out of buffer manager 204 through computer interface 203. Interface 203 interfaces device controller 200 to peripheral bus 160, which, for example, could be an IDE bus using ATA or ATAPI protocols, an SCSI bus, or an IEEE 1894-1995 bus. ATAPI protocols for CD-ROM devices are given in *SMALL FORM FACTOR COMMITTEE*, "Specification of ATA Packet Interface for CD-ROMs, SFF-8020i," Revision 2.5, Jul. 21, 1995 (hereinafter "ATAPI Specification"), herein incorporated by reference in its entirety.

A microprocessor 202, which may be the same as microprocessor 170 of physical device 100 (FIG. 1), has firmware tailored to operate with device controller 200. Microprocessor 202 communicates with device controller 200 through a microprocessor interface 209.

The remainder of a physical storage device is represented by storage device 201. Storage device 201, therefore, can include digital signal processor 130, amplifier 126, signal detector/writer 122, storage media 110, motor 114, motor/servo controller 118, and possibly digital/analog converter 135, for example. Device controller 200 communicates with storage device 201 through storage device interface 208. Storage device interface 208 can be controlled and monitored by microprocessor 202, directly through microprocessor interface 209 or through autodisk controller 212. Finally, a memory buffer 211 communicates with device controller 200 through memory interface 206. Typically, various types of DRAM are used for memory buffer 211. These types of DRAM include fast page mode, EDO, synchronous, or RAMBUS. Any memory device can be used as memory buffer 211. To maximize transfer speed, memory buffer 211 can be a dedicated SRAM cache. However, to save costs memory buffer 211 is often used for multiple purposes and implemented by a DRAM. Also, the DRAM of memory buffer 211 could be embedded within device controller 200. A memory arbitration scheme is necessary when memory buffer 211 is shared.

In some embodiments of the invention, storage device 201 is a CD-ROM drive such as is available from Phillips Electronics Corp. However, storage device 201 can be other CD-ROM controllers from any manufacturer (e.g., Sony or Hitachi), DVD devices, magnetic storage devices, or other devices capable of physically storing and reading out data. In addition, some embodiments are capable of interaction with a number of different storage devices, each of which have a unique interface protocol. In those embodiments, protocols for controlling each of the physical storage devices and for interfacing with each of the possible microprocessors are stored so that the resulting integrated circuit is more universally applicable. Similarly, embodiments of the invention are usable with any microprocessor 202 such as, for example, the INTEL 8032 microprocessor. Microprocessor 220 may also be embedded within device controller 200.

In a read operation, storage device interface 208 receives data from storage device 201 and transfers that data to memory controller 206 for storage in memory buffer 211. The data is read from memory controller 206 into buffer manager 204 and transmitted to host computer 190 in response to buffer manager 204 control signals. In some embodiments, error correction of data read from storage device 201 and stored in memory buffer 211 is accomplished by an error correction circuit (ECC) 210. ECC can perform statistical correction, e.g., Reed-Solomon or Viterbi corrections, on data stored in memory buffer 211. This form of error correction, i.e. independently performing the error correction directly on memory buffer 211, is more often implemented when storage device 201 is CD-ROM. If the storage device 201 is DVD, however, error correction by ECC 210 must be done "on-the-fly," before the data is written into DRAM memory buffer 211, because of the greater speed of DVD devices compared to CD-ROM devices.

Each time a block of data is written into memory buffer 211, a valid cache count register 207 is incremented and whenever data is read from memory buffer 211 valid cache count register 207 is decremented. The above described data flow is reversed in a write operation.

Figure 3A:
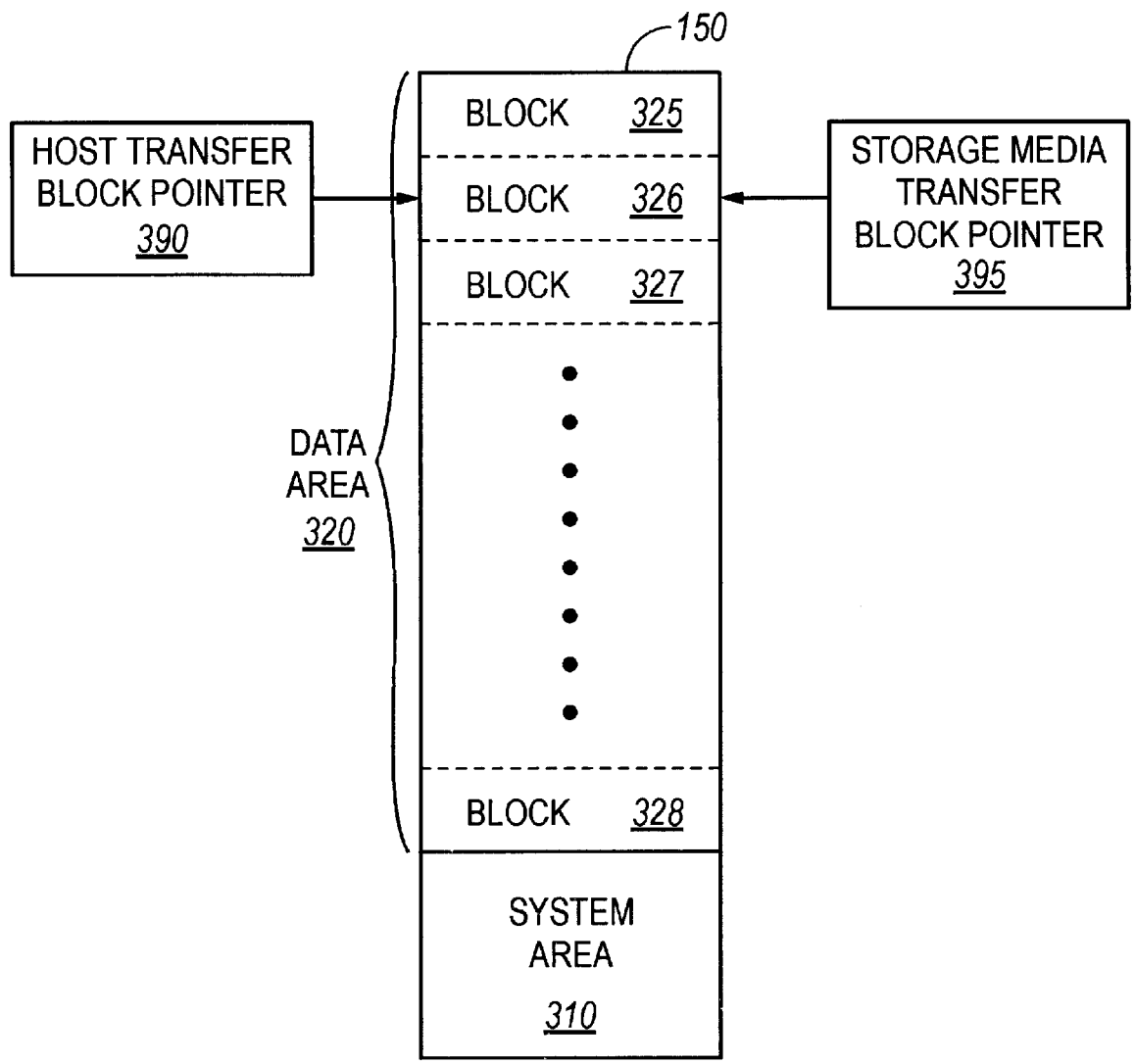
FIG. 3(a) shows a memory buffer used with the device controller.

FIG. 3(a) shows the contents of memory buffer 211 according to one implementation of device controller 200. Memory buffer 211 is partitioned into a system area 310 and a data area 320. Data from storage media 110 are stored in data area 320. Most implementations of device controller 200 store entire logical blocks of data 325–328 from storage media 110 (storage media blocks) sequentially in data area 320. Furthermore, some implementations also store error detection information such as a checksum with each storage media block.

Figure 3C:
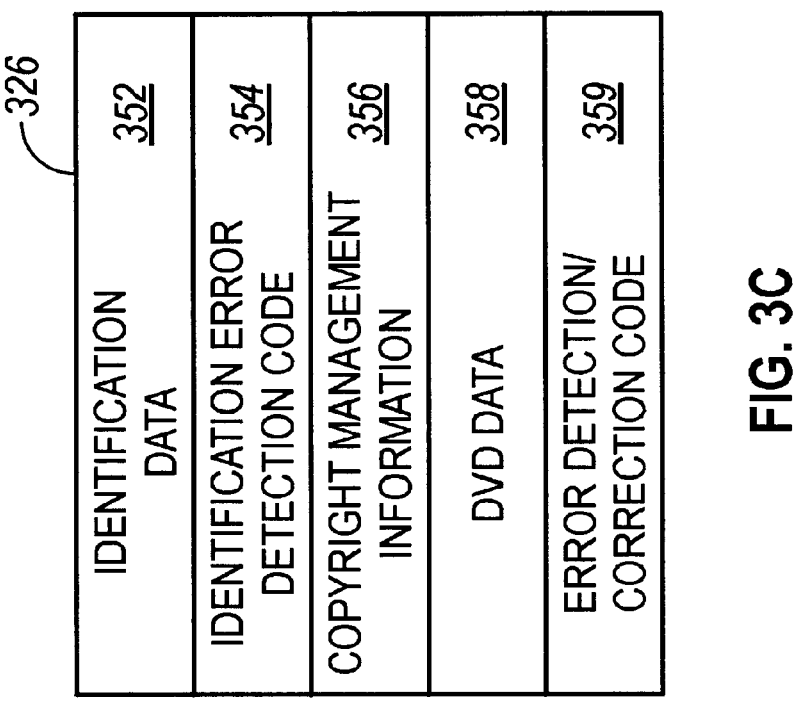
FIG. 3(c) shows a data block that is typical for DVDs.
Figure 3B:
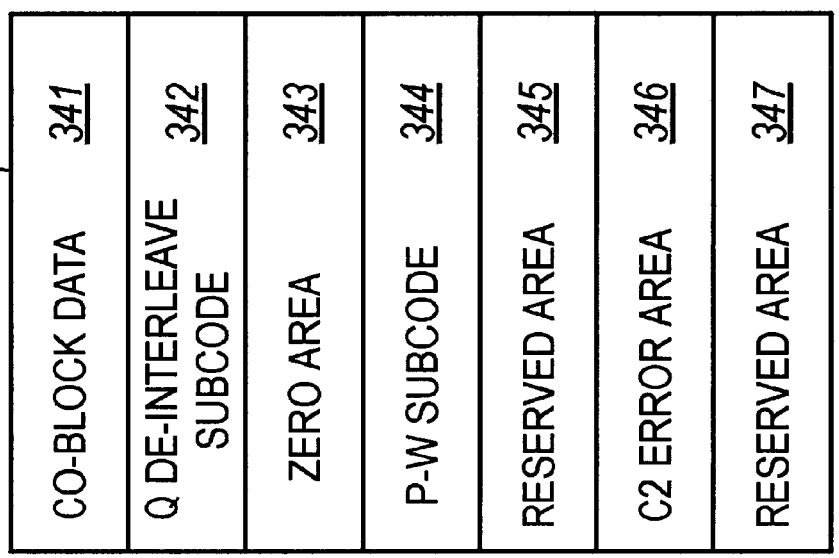
FIG. 3(b) shows a data block that is typical for CD-ROM disks.

FIG. 3(b) shows the details of data block 326 if storage device 201 is a CD-ROM drive. For a CD-ROM drive, data block 326 includes CD block data 341 (typically 2,352 bytes), Q de-interleave subcode 342 (12 bytes), zero area 343 (4 bytes), P–W subcode 344 (96 bytes), optional reserved area 345 (96 bytes), optional C2 error area 346 (296 bytes), and optional reserved area 347 (216 bytes). Therefore, if storage device is a CD-ROM drive as described above, each data block 325–327 in data area 320 is either 2.5 kilobytes or 3.0 kilobytes in length. Other combinations of header, data areas, and error combinations yield CD block data sizes of 2048, 2052, 2056, 2332, 2336, 2340 or 2352 bytes. In addition, some embodiments of device controller 200 store the CD block data from different CD-ROM blocks contiguously in one data area and P-W subcode data of different CD-ROM blocks contiguously in another data area of the cache.

FIG. 3(c) shows details of data block 326 where storage device 201 is a DVD drive. For a DVD drive, data block 326 includes identification data 352 (4 bytes), identification error detection code 354 (2 bytes), copyright management information 356 (6 bytes), DVD data 358 (2048 bytes), and error detection code 359 (4 bytes). Identification error detection code 354 is a check code on the block identification data 352. Error detection code 359 is a check code on DVD data 358.

Figure 3D:
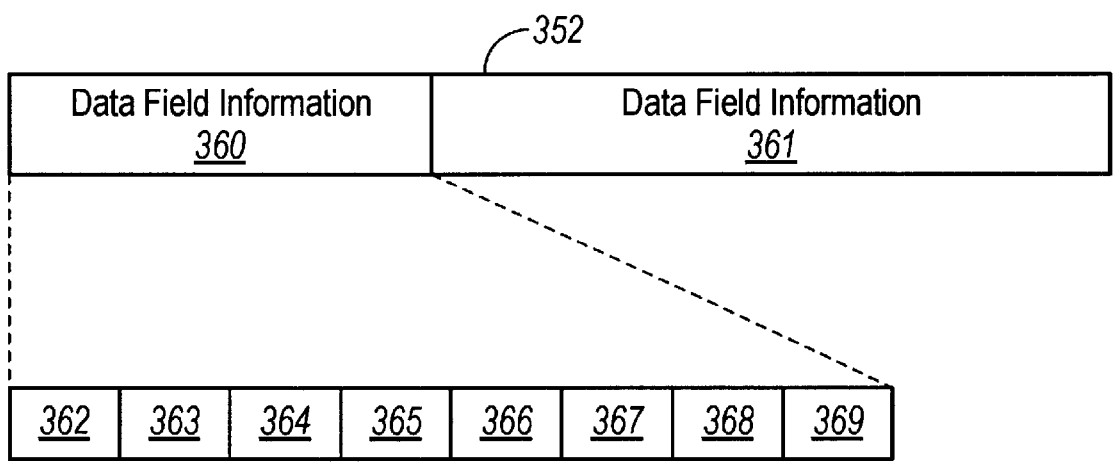
FIG. 3(d) shows an example of a data block for a rewritable DVD.

FIG. 3(d) shows details of identification data 352 of FIG. 3(c) for one configuration of a DVD data block. Identification data 352 includes data field information 360 and data field number 361. Data field information 360 includes sector format type 362, tracking method 363, reflectivity 364, area type 365, data type 366, 367, and layer number 368. There may also be reserved spaces 369. In one specification, sector format type 362 indicates either CLV format type specified for Read-only disc and recordable disc or zoned format type specified for rewritable disc; tracking method 363 indicates either pit tracking or groove tracking; reflectivity 364 indicates either greater than 40% reflectivity or 40% or less reflectivity; area type 365 indicates one of data area, lead-in area or lead-out area; data type 366 indicates either read-only data or rewritable data; and layer number 368 indicates either layer 0 or layer 1. Other specifications may include other designations. Data field number 361 indicates sector numbers and whether the block contains user data or no user data.

Typically, memory buffer 211 is organized as a dual-port FIFO, i.e. data is read out of memory buffer 211 in the same order as the data was stored. Buffer manager 204 includes a host transfer block pointer 390 and a storage device interface 208 includes a storage media transfer block pointer 395. Host transfer block pointer 390 (FIG. 3(a)) is used to calculate the address of the appropriate block of data being sent to or received from host computer system 190. Storage media transfer block pointer 395 is used to calculate the address of the appropriate block of data being sent to or received from storage media 110. For a read transaction, host transfer block pointer 390 is the read pointer for DRAM memory buffer 211 and storage media transfer block pointer 395 is the write pointer for DRAM memory buffer 211. Conversely, for a write transfer, host transfer block pointer 390 is the write pointer and storage media transfer block pointer 395 is the read pointer. Both host transfer block pointer 390 and storage media transfer block pointer 395 can be stored in registers or counters in, for example, memory buffer 211 or memory controller 206. In one embodiment, host transfer block pointer 390 and storage media transfer block pointer 395 point to storage media blocks in memory buffer 211. In other embodiments, host transfer block pointer 390 and storage media transfer block pointer 395 are logical block addresses compatible with those that are sent from host computer system 190. In either case, memory controller 206 uses block pointers 390 and 395 to access memory buffer 211. In some embodiments, memory controller 206, can monitor host transfer block pointer 390 and storage media transfer block pointer 395 to insure that data is not written over data blocks that have not yet been transferred out of memory buffer 211.

Storage device interface 208 converts a logical block address (LBA) received from host computer 190, corresponding to a logical block, a unit of data as recognized by the host computer 190, to units appropriate for physical device 201. In a CD-ROM drive, the logical block address is converted to an "MSF" address. The MSF address is the physical address used for accessing a CD-ROM disk. An F field corresponds to one physical sector. An S field unit is 75 F field units and an M field unit is 60 S field units. Valid F fields vary from 0 to 74, S fields vary from 0 to 59, and M fields vary from 0 to 99. A CD-ROM physical sector size is 2048, 2052, 2056, 2332, 2336, 2340 or 2352 bytes per sector. See ATAPI CD-ROM specification, page 73. These values correspond to different user data plus various configurations of header, subheader and error codings. Id. CD-ROM disks are typically less than 72 minutes long and each data block corresponds to a 7.5 millisecond frame.

ATA or ATAPI commands are received from host computer system 190 by computer interface 203. Computer interface 203, buffer manager 204, and autohost 205 detect the presence of a command and send an interrupt to microprocessor interface 209, alerting microprocessor 202 of the presence of the command. Microprocessor 202 processes the interrupt and also alerts storage device 201.

The ATAPI command is a 12 byte command. FIG. 4 shows a 12 byte command packet 400 compatible with the ATA/ATAPI protocol. Byte 0 of the 12 byte command contains the operation code. An operation code of A8h (A8 in hexidecimal format) corresponds to a read command for a DVD storage device. An operation code of 28h corresponds to a read command for a CD-ROM device. Other operational codes are available to query the physical storage device system (Device Controller 200, storage device 201, microprocessor interface 209, and memory buffer 211) regarding status or to request mechanical commands (such as loading or unloading of CDs). See ATAPI Specification, page 90.

Bytes 1 of the 12 byte packet command is reserved and is always set to 0. For a DVD storage device, byte 2 is the most significant byte (MSB) of the logical block address (LBA). Bytes 3, 4, and 5 hold the logical block address, if required by the operation corresponding to the operation code in byte 0. If the command packet contains a read command, bytes 3–5 contain the logical block address at which data is to be read, with byte 5 containing the least significant byte (LSB) of the logical block address. If the command packet contains a write command, bytes 2–5 contain the logical block address at which data is to be written. In DVD devices, bytes 6–9 indicate the number of blocks of data to be transferred. In CD-ROM devices, bytes 6 and 7 are reserved and are always set to 0. Bytes 8–9 indicate the number of blocks to transfer. Bytes 10 and 11 are reserved and should both be 0.

Buffer manager 204 receives command packets from host computer system 190 and also receives and controls the flow of data packets to and from DRAM memory buffer 211. Several implementations of buffer manager 204 are described in copending U.S. patent Ser. No. 08/788,312, filed on Jan. 24, 1997, assigned to the assignee of this invention, incorporated herein by reference in its entirety. These buffer managers are capable of transferring data between memory buffer 211 and host computer system 190 with minimal involvement from microprocessor 202.

Buffer manager 204 is connected to and partially controlled by an autohost 205. Autohost 205, on specific read conditions, directs buffer manager 204 to transfer data blocks already resident in DRAM memory buffer 211 to host computer 190. Autohost 205 is described in copending U.S. patent Ser. No. 09/130,999, assigned to the assignee of this invention, incorporated herein by reference in its entirety.

Figure 5:
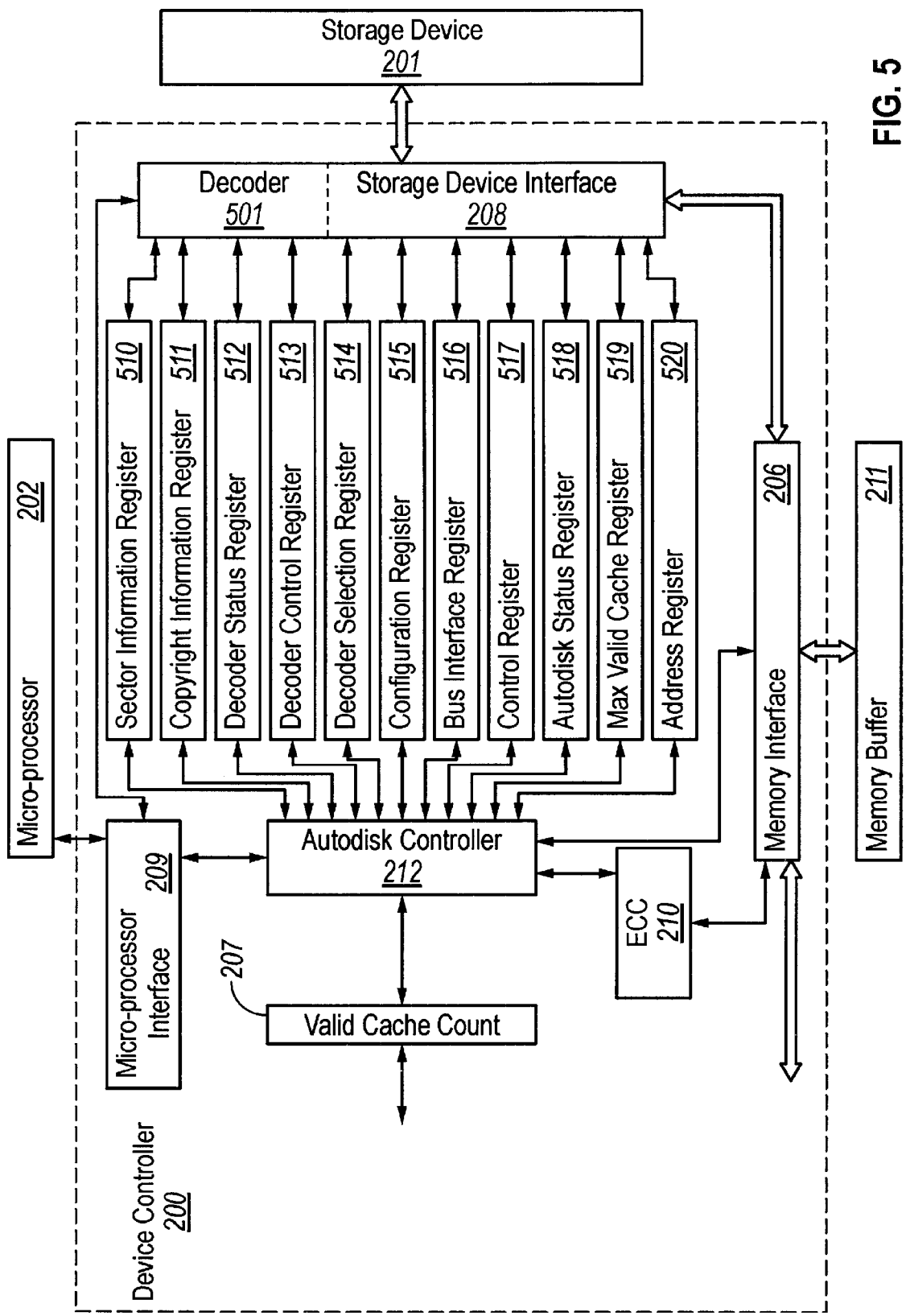
FIG. 5 shows a functional block diagram of a portion of a device controller having an autodisk controller according to an embodiment of the present invention.

FIG. 5 shows a block diagram of a portion of an embodiment of device controller 200 that includes an autodisk controller 212. Autodisk controller 212 is coupled to storage device interface 208 and microprocessor interface 209. In some embodiments, autodisk controller 212 is further coupled to memory interface 206 and ECC 210. Autodisk controller 212 intercepts commands and interrupts between the microprocessor (through microprocessor interface 209) and storage device 201 (through storage device interface 208) and relieves the microprocessor of monitoring and error checking functions. For example, in a monitor mode autodisk controller 212 can automatically monitor target address searching, data block status checking, and data buffering. In some embodiments autodisk controller 212 in buffer mode can monitor incoming data blocks for errors and automatically notify microprocessor 202 of errors. Autodisk controller 212 can alert microprocessor 202 if, for example, memory buffer 211 (controlled through memory controller 206) is full, the storage device has overshot the target address, or if there are errors in the incoming data blocks. Autodisk controller 212 also increments valid cache count register 207 when a block of data is buffered into memory.

Autodisk controller 212 can be coupled with other registers in order to monitor the status of incoming data blocks. Some registers can also control the specific operation of autodisk controller 212. For example, in device controller 200, autodisk controller 212, is coupled to a sector information register 510, a copyright information register 511, a decoder status register 512, a decoder control register 513, a decoder selection register 514, a configuration register 515, a bus interface register 516, a control register 517, an autodisk status register 518, a max valid cache register 519 and an address register 520. Each of these registers provide information and commands to autodisk controller 212, provide information from autodisk controller 212 to microprocessor 202, or provide information for other portions of device controller 200. Each of registers 510–518 include setable flags and codes to alter, control or communicate operation of device controller 200 and the status of incoming data blocks.

In FIG. 5, storage device interface 208 includes decoder 501. Decoder 501 reads data from the header from incoming data block. That information can, as needed, be loaded into registers (e.g., sector information register 510, copyright information register 511, and address register 520). For example, form data block 326 of FIG. 3(c), decoder 501 can read identification data 352, identification error detection code 354, copyright management information 356 and error detection/correction code 359. Decoder 501 can then interpret this information and appropriately load the proper register.

Address registers 520, which may be segregated into more than one individual register (e.g. a high, medium and low address), stores a logical block address (LBA) for storage device 201. In a first mode of operation, address register 520 stores the incoming sector physical address when device controller 200 is in monitor mode and in buffer mode stores the last buffered data block sector physical address. In this mode of operation, signified by the autodisk or target search flags of control register 517 not being set, microprocessor 202 is required to monitor the sector address stored in address register 520 to determine when device controller 200 is switched from monitor mode to buffer mode. In a second mode of operation, signified by the autodisk and target search flags of control register 517 being set address register 520 stores a target address and, when the sector address reaches the target address less one, autodisk 212 triggers a switch from monitor mode to buffer mode in device controller 200.

Sector information register 510 stores incoming sector information in monitor mode and stores last buffered sector information in buffer mode. Sector information register 510 can include a sector information type (SFINFO) bit, which indicates either CLV type or zoned type sector formats; a tracking mode bit (TRMOD), which specifies pit tracking or groove tracking; a reflectivity bit (REFL), which indicates whether the reflectivity is more, less or equal to 40% an area type (ATYP), which indicates data, lead-in, lead-out or middle area data area; data type (DTYPE), which indicates whether the data is read only or not; and layer number (LNUM), which indicates whether the data area is layer 0 or layer 1. In the target search (TarSch) flag autodisk flag, and layer number check (LChk) flag of control register 517 are all set, then autodisk controller 212 compares the layer number of the incoming blocks with an LNUM bit in sector information register 510. If the incoming block layer number is not equal to that stored in sector information register 510, then autodisk sets an LErr flag in autodisk status register 517 and notifies microprocessors 202.

Copyright information register 511 contains the incoming sector copyright information byte in monitor mode or the last buffered sector copyright information in buffer mode. For example, in one embodiment a copyright bit (CPM) indicates whether or not the sector contains copyrighted material. Another bit, the CP/SEC bit, indicates if there is a specific data structure for the copyright protection system (if one is indicated by the CPM bit). A set of CGM bits indicates what form of copying is permitted: copying permitted without restriction, one generation of copying permitted or copying not permitted, for example. Each area type (i.e., lead-in area, lead-out area, middle area or data area) can have different copyright designations.

Decoder status register 512 is used to provide the results of the identification error detection (see IED 354 portion data block 326 shown in FIGS. 3(*c*) and 3(*d*)) and the error detection correction code (see EDC 359 portion of data block 326 shown in FIGS. 3(*c*) and 3(*d*)). Decoder status register 512 can include several error flags, including the following fatal errors: Invalid Status (InValid), which is set when the succeeding decoder status has written over the status register before the register has been read; Overflow Error (OVErr), which is set when a FIFO overflow occurs in interface 208; and ID Error, which is set when an uncorrected error occurs. Additionally, a Data EDC Error (EDCErr) can be set to check the EDC result. Data error detection can be performed "on-the-fly" by ECC 210. Additional bits can indicate errors in synchronization of data blocks with sectors. For example, a no sync error bit (NoSync) or an Illegal Sync Error bit (IllSync) can be set when the sync pattern was not detected in its expected location.

Decoder control register 513 indicates in which mode decoder 501 is operating. For example, decoder 501 can operate in stop mode, monitor mode or buffer mode. In stop mode, the decoder is completely stopped and incoming data is ignored. In monitor mode, incoming sector address data and sector copyright information is monitored and latched into address register 520, sector information register 510, copyright information register 511, and decoder status register 512. If the autodisk flag of controlled register 517 is set, then address and sector information is presented directly to autodisk controller 212. In buffer mode, decoder 501 latches the last information buffered into memory buffer 211 into address registers 520, sector information register 510, copyright information register 511 and decoder status register 512.

Decoder selection register 515 stores the selection of decoder engine used in decoder 501. For example, the decoder engine can select a DVD decoder or CD-ROM decoder in response to a decoder selection (DecS) bit of decoder selection register 515.

Configuration register 515 includes several control settings, including a data bus type flag (DBus), which selects between a parallel data bus and a serial data bus; an IED disable flag (IEDD), which disables IED error detection and correction operations; an EDC disable bit (EDCD), which disable data error detection in buffer mode; a sync enable, flag (DSYNC), which controls the indication of the beginning of the data sector (this flag is ignored if the data bus is serial or if storage device 201 is a CD-ROM device with a 12 byte sync pattern at the beginning of the data sector; a sector size field (DSize) which defines the data size of the data block, for example 2048, 2064 or 2340 bytes; and a scramble control field (SCTRL) which controls the operation of a descrambler, for example setting for no scramble, DVD scramble, or CD-ROM scramble.

Bus interface register 516 can include control flags, including DVD error flag input enables (DTERA); TOS active level (TOSA) indicating the top-of-sector (TOS) pin indication enable for parallel bus operation; data request pin enable (DREQA) for parallel bus operation; data acknowledge (DATACK) enable (DACKA) which is set high for acknowledging data; strobe control (STROC) which controls latching of the incoming data; strobe enable (CSTRA) controls whether the rising edge or the falling edge of the clock signal triggers the latching of incoming data; EDC flag (EDCF) controls whether the EDC flag byte is available or not; and EDC Byte location is utilized in serial bus configurations to trigger whether the EDC byte is the first byte received or the last byte received in the data block. These parameters are typically dependent on storage device 201 and will be set according to the specifications of storage device 201.

Control register 517 includes flags for setting operation of device controller 200 and autodisk controller 212. For example, control register 517 can include the following flags: layer numbers check enable (LChk), target search enable (TarSch), copyright check enable (CprChk), header sequential check enable (SeqChk) data area header check (AreaChk), and autodisk enable (AutoDisk). Layer number check enable (LChk) enables autodisk controller 212 to check the incoming sector layer number against the value stored in the LNUM bit of sector information register 510, generate an error (LErr) that can be stored in autodisk status register 518 if there is a difference, and notify microprocessors 202 of an error. Target search enable (TarSch), in monitor mode, enables monitoring of the incoming ID so that autodisk controllers 212 can trigger a switch to buffer mode when the sector number reaches one less than the address stored in address registers 520. Copyright check enable (CprChk) enables autodisk controller 212 to perform copyright checking. Header sequential check (SeqChk) allows autodisk controller 212 to perform checking for sequential data blocks. Data area header check (AreaChk) enables autodisk controller 212 to check the data area for appropriateness. Autodisk enable (AutoDisk) enables automatic checking with the autodisk controller 212. If the autodisk enable flag is not set, most embodiments of device controller 200 will ignore copyright check enable, sequential check enable and area check enable settings. Further, control registers 517 can include a lock status flag (Lock) which, in buffer mode, locks the values of address registers 520 and valid cache count register 207. Additionally, a decoder buffer mode pause enable (DPause) flag which, in buffer mode and with a parallel data bus, allows pausing of buffering while the value stored in valid cache count 207 is equal to the value stored in max valid cache register 519. Max Valid cache register 519 stores the maximum number of blocks that are allowed to be buffered into memory buffer 520 when autodisk controller 212 is enabled.

With the autodisk enable flag and the target search enable flag of control register 517 set, in monitor mode the sector number of incoming data blocks are checked and device controller 200 switches from monitor mode to buffer mode when the sector number reaches one less than the address stored in address registers 520. In that case, a target reached (TarRch) flag is set in autodisk status register 518, controller 200 switches to buffer mode, and succeeding blocks of data are buffered. In buffer mode, with the autodisk flag set, valid cache count register 207 is maintained and, if valid cache count register 207 is equal to max valid cache register 519, controller 200 is switched to stop mode and errors are generated. Additionally, other parameters are monitored according to other flags in control register 517. In stop mode, no operations are performed.

Autodisk status register 518 indicates various information or errors from autodisk controller 212. When autodisk controller 212 generates an interrupt and notifies microprocessor 202, autodisk status register 518 can be read in order to determine the error generated. Autodisk status register 518 can include a buffer full (Buffull) flag, a disk error (DiskErr) flag, an over shoot error (OshtErr) flag, a target reached (TarRch) flag, a copyright error (CprErr) flag, a header sequential error (SeqErr) flag, a data area header error (AreaErr) flag, and a layer number check error (LErr) flag. These flags are set by autodisk controller 212 to indicate the associated errors. The buffer full flag (Buffull) is set to indicate that the value stored in valid cache count 207 is equal to that stored in max valid cache register 519. The disk error (DiskErr) flag is set to indicate a general disk error, the details of which are stored in decoder status register 512. The overshoot error (OshtErr) flag, in monitor mode, is set to indicate that the incoming sector ID is greater than the value stored in address registers 520. The target reach (TarRch) flag, in monitor mode, is set to indicate that the sector ID is one less than the address stored in address register 520 and that controller 200 will switch to buffer mode for the next incoming block of data. The copyright error (CprErr) flag is set to indicate a copyright error event. The header sequential error (SeqErr) flag is set to indicate that incoming data blocks are not sequential. The data area header error (AreaErr) flag is set to indicate a data area check error. The layer number check error (LErr) flag is set to indicate that the sector layer number is not equal to the layer number stored in sector information register 510.

Figure 6:
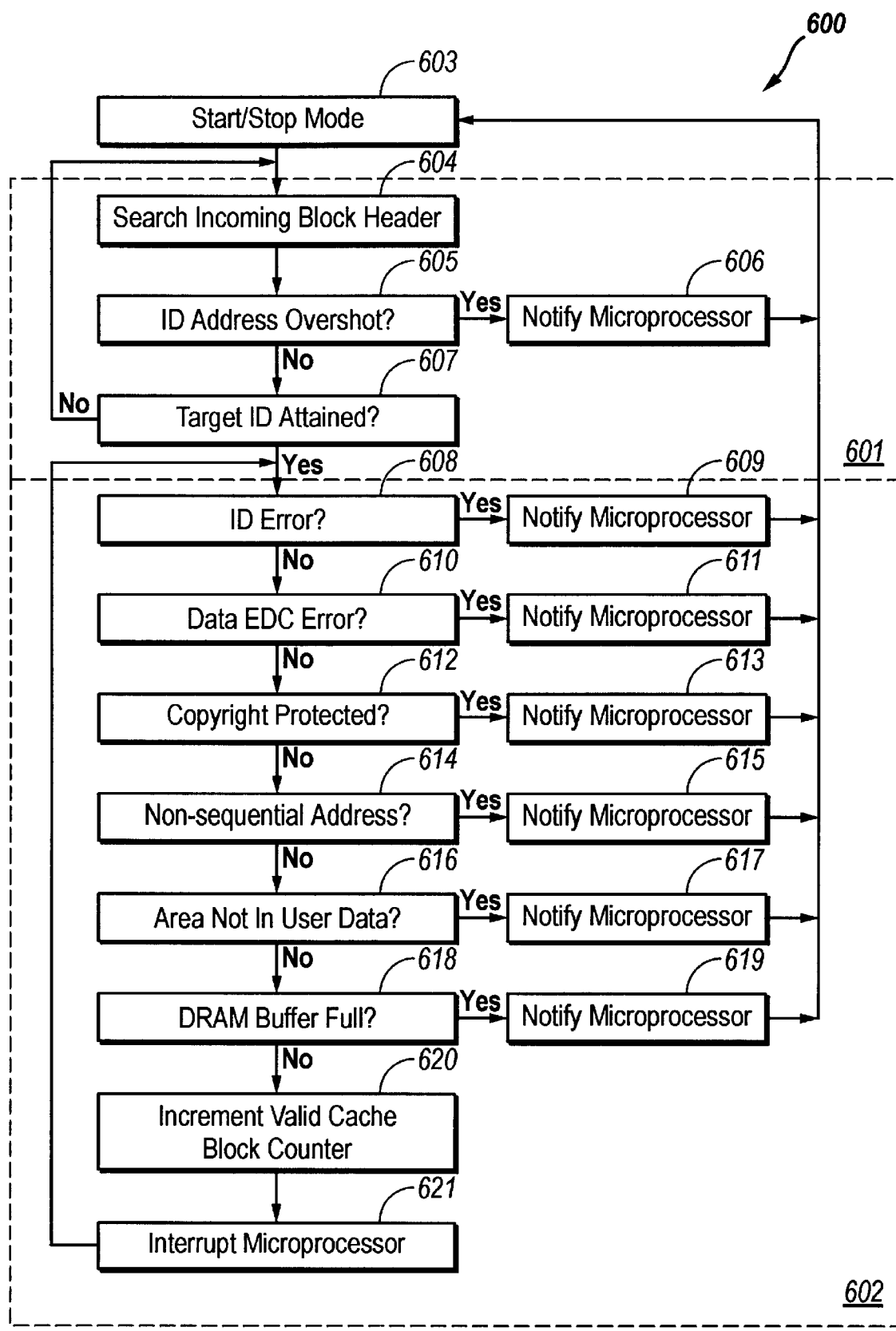
FIG. 6 shows a state machine for the embodiment of autodisk controller shown in FIG. 5.

FIG. 6 shows a block diagram of a state function 600 for autodisk controller 212. In the example embodiment presented here, autodisk controller 212 can be activated by setting the autodisk enable flag of control register 517. In block 603, stop mode, no monitoring or buffering of incoming data blocks occurs. Area 601 indicates monitor mode, where incoming blocks are monitored, and area 602 indicates buffer mode, where incoming blocks are buffered to memory buffer 211.

In stop mode block 603, control register 516, address register 520, max valid cache register 519, bus interface register 516, configuration register, decoder selection register 514 and decoder control register 513 can be loaded by microprocessor 202. Device controller 200, and therefore autodisk controller 212, progress to monitor mode area 601 upon an interrupt command from microprocessor 202 or from storage device interface 208. If autodisk enable is set in control register 517, then autodisk state function 600 is executed. If autodisk enable is not set, then automatic checking of incoming data blocks is not performed. If any checking is performed, then it must be performed by microprocessor 202. Setting autodisk enable and executing state function 600, therefore, relieves microprocessor 202 of the tasks of checking incoming data blocks for error and monitoring the receipt of incoming data blocks.

In monitor mode area 601, address register 520 stores the incoming sector physical address, sector information register stores the incoming sector information, and copyright information register stores the incoming copyright information. Autodisk controller 212 receives block header information in search incoming block header 604. Block header information is received from storage device interface 208 and decoder 501.

In block 605, if the target search enable (TarSch) flag of control register 517 is set, the sector ID is compared with the value stored in address register 520 and if the target address is overshot (i.e., sector ID number is greater than or equal to the value stored in address register 520), then the over shoot error flag (OShtErr) in autodisk status register 518 is set and autodisk 212 notifies microprocessor 202 in notify block 606. State function 600 then returns to stop mode 603.

In block 607, if the target search enable (TarSch) flag of control register 517 is set, the sector ID is again compared with the value stored in address register 520. If the sector ID is not one less than the value stored in address register 520, then controller 200 remains in monitor mode and state function 600 returns to block 604 to await the next block of data. If sector ID is one less than the value stored in address register 520, then the target reached flag (TarRch) of autodisk status register is set and controller 200 switches to buffer mode. State function 600, then, proceeds to buffer mode 602. The sector ID is monitored only if the target search enable flag of control register 517 is set.

If the target search enable (TarSch) flag of control register 517 is not set, then microprocessor 202 must compare the desired address with that of the incoming data buffer. Microprocessor 202, then, triggers the switch in device controller 200 from monitor to buffer mode. In buffer mode area 602, state function 600 proceeds to block 608 when device controller 200 is switched from monitor mode to buffer mode.

In buffer mode area 602, address register 520 stores the sector ID of the last buffered data block, sector information register stores the sector information of the last buffered data block, and copyright information register stores the copyright information of the last buffered data block.

In block 608 of state function 600, autodisk controller 212 checks for a sector ID error. Sector ID errors can be determined by checking the Invalid Status (InValid), overflow error (OVErr), ID Error (IEDErr), no sync (NoSync) or illegal sync (IllSync) flags of decoder status register 512. If an error is detected, the disk error flag of autodisk status register 518 is set and state function 600 proceeds to block 609. In block 609, microprocessor 202 is notified and state function 600 returns to stop mode 603. If no error is detected in block 608, state function 600 proceeds to block 610.

In block 610, autodisk controller 212 checks for an EDC error. The EDC error can be checked by reading the EDCErr flag of decoder status register 512. The EDC value of the incoming data block can be determined in EEC 210. EDC values can be determined "on-the-fly" or by some other method. If the EDC disable flag (EDCD) of configuration register 515 is set and the EDC flag (EDCF) of bus interface register 516 is set then the incoming EDC flag from decoder 501 is checked. If the result is incorrect, autodisk controller 212 signals an EDC error by notifying microprocessor 202 in block 611. State function 600 then proceeds to stop mode 603. If no EDC errors are detected in block 610, then state function 600 proceeds to block 612.

In block 612 autodisk controller 212 checks copyright protection, if the copyright check (CprChk) flag of control register 517 is set. If the copyright check (CprChk) flag of control register 517 is not set, then no copyright checking is performed by autodisk controller 212. Copyright errors can be checked by consulting copyright information register 511. For example, if the CPM flag of copyright information register 511 is set then there is copyrighted information. The CGM field of copyright information register 511 can then be checked for copyright permission (e.g., copying permitted, copying not permitted, or limited copying permitted). If a copyright error is indicated, then the copyright error flag (CprErr) of autodisk status register 518 is set and state function 600 proceeds to block 613. In block 613, microprocessor 202 is alerted and state function 600 returns to stop mode 603. If no copyright errors are detected in block 512, then state function 600 proceeds to block 614.

In block 614 state function 600 checks to insure that data blocks are sequential, provided that the sequential check flag (SeqChk) of control register 517 is set. The sector ID number of the incoming data block can be compared with the address stored in address register 520 to determine if sequential data blocks are being read. If incoming data blocks are not sequential, then autodisk controller 212 can set the sequential error flag (SeqErr) of autodisk status register 519 and state function 600 proceeds to block 615. In block 615, microprocessor 202 is alerted of an error and state function 600 proceeds to stop mode 603. If the sector IDs are sequential and there is no error, then state function 600 proceeds to block 616.

In block 616, state function 600 checks to insure that the data area is appropriate, provided that the area check (AreaChk) flag of control register 517 is set. If autodisk controller 212 checks the area, then the area type (ATYP) information in sector information register 510 is checked to insure that the sector area type is the data area. If it is not data area, then autodisk controller 212 sets the area error (AreaErr) flag of autodisk status register 518 and state function 600 proceeds to block 617. In block 617, microprocessor 202 is notified of an error and state function 600 proceeds to stop mode 603. If there is no error, then state function 600 proceeds to block 618.

In block 618, autodisk controller 212 checks to see if memory buffer 211 is full. Autodisk controller 212 compares the current value of valid cache count 207 with the value stored in max valid cache register 519 and, if they are equal, sets the buffer full (Buffull) flag of autodisk status register 518. If the buffer is full, state function 600 proceeds to block 619 and microprocessor 202 is notified. From block 619, state function 600 proceeds to stop mode 603. If the value of valid cache count 207 is less than the value stored in max valid cache register 519, then memory buffer 211 is not full and state function 600 proceeds to block 620.

In block 620, valid cache count register 207 is incremented to indicate that the data block is buffered into memory buffer 211. Additionally, device controller 200 updates sector information register 510, copyright information register 511 and address register 520 in accordance with the newly buffered data block. State function 600 then proceeds to block 621 where microprocessor 202 is notified of the buffered data block. State function 600 then returns to block 608 in order to process the next incoming data block.

The process of buffering incoming data blocks will continue until memory buffer 211 is full. Device controller 200 processes data blocks as requested by host computer 190. After all of the data requested by host computer 190 is transferred to host computer 190, device controller 200 continues reading data from storage device 201 until memory buffer 211 is filled with subsequent data. Statistically, the next request for data from host computer 190 most likely will be for data that is, at least partially, already held in memory buffer 211. That data, therefore, can be supplied much quicker than it would be if it must be read from storage device 201. FIG. 7 shows a Verilog code of an embodiment of autodisk controller 212 according to the present invention.

The above examples of embodiments of the invention are demonstrative only. One skilled in the art will recognize, for example, that control and status registers may be organized differently than that described here. Additionally, the order in which autodisk controller 212 checks the incoming data block (as described in FIG. 6) is not important. Also, embodiments of autodisk controller 212 may check additional characteristics of the incoming data blocks than are specifically described in the above examples. These examples are, therefore, demonstrative only and are not limiting. The scope of the invention is limited only by the following claims.

We claim:

1. A device controller, comprising
    a storage device interface for interfacing with a storage device;
    a memory interface for interfacing with a memory buffer;
    a microprocessor interface for interfacing with a microprocessor; and
    an autodisk controller coupled to the storage device interface and the microprocessor interface;
wherein the autodisk controller
    in monitor mode is capable of monitoring incoming data block address identification and, when the data block address identification matches a target address, can trigger a switch to buffer mode and notify the microprocessor; and
    in buffer mode is capable of checking parameters regarding incoming data blocks and notifying the microprocessor of errors in incoming data blocks or status of the device controller before the incoming data blocks are stored in the memory buffer.

2. The controller of claim 1, wherein the parameters regarding data blocks are chosen from the group consisting of an ID error, a data EDC error, copyright protection, address errors, and data area errors.

3. The controller of claim 2, wherein in the autodisk controller in buffer mode further checks to determine if the memory buffer is full and notifies the microprocessor if the memory buffer is full.

4. The controller of claim 1, wherein the storage device is a DVD.

5. The controller.of claim 1, wherein the storage device is a CD-ROM.

6. The controller of claim 1, wherein the storage device interface includes a decoder, the decoder reading a device address, sector information, and copyright information from incoming data blocks.

7. The controller of claim 6, wherein the storage device interface is coupled with a sector information register, a copyright information register, and an address register.

8. A device controller, comprising
    an autodisk controller coupled between a storage device interface and a microprocessor interface, the storage device interface coupled to at least one storage register to store information regarding incoming data blocks, wherein the autodisk controller monitors incoming addresses and, when a target address is reached, buffers data for transfer to a host.

9. The controller of claim 8, wherein the autodisk controller is capable of comparing the address of an incoming data block with a stored address and signaling an error to the microprocessor interface if the address is greater than a target address.

10. The controller of claim 8, wherein the autodisk controller is capable of checking for ID errors and notifying the microprocessor interface upon detection of an ID error.

11. The controller of claim 8, wherein the autodisk controller is capable of checking for data EDC errors and notifying the microprocessor interface upon detection of an EDC error.

12. The controller of claim 8, wherein the autodisk controller is capable of checking for copyright protection errors and notifying the microprocessor interface upon detection of a copyright error.

13. The controller of claim 8, wherein the autodisk controller is capable of checking for sequential addresses in incoming data blocks and notifying the microprocessor interface upon detection of nonsequential addresses in incoming data blocks.

14. The controller of claim 8, wherein the autodisk controller is capable of checking for data area errors and notifying the microprocessor interface upon detection of a data area error.

15. The controller of claim 8, wherein the autodisk controller is capable of checking for a memory buffer full status and notifying the microprocess interface when the memory buffer is full.

16. The controller of claim 8, wherein the autodisk controller increments a valid cache block register when an incoming data block is buffered into a memory buffer.

17. A method of controlling a storage device, comprising:

monitoring, with a circuit independent of a microprocessor, incoming data block addresses;

buffering incoming data after the circuit detects a target address in the incoming data block addresses;

notifying the microprocessor of the start of buffering; and monitoring incoming data blocks while buffering.

18. The method of claim 17, wherein monitoring incoming data blocks includes checking for address errors.

19. The method of claim 17, further including monitoring for a buffer full condition and notifying the microprocessor when the buffer full condition exists.

* * * * *